United States Patent
Sakarovitch et al.

(10) Patent No.: US 7,930,130 B2
(45) Date of Patent: Apr. 19, 2011

(54) METHOD AND SYSTEM FOR REDUCING DEVICE TEST TIME

(75) Inventors: Charlotte Sakarovitch, Nice (FR); Marielle Perrin, Lyons (FR); Laurent Zenouda, Villeneuve Loubet (FR)

(73) Assignee: Texas Instruments Incorporated, Dallas, TX (US)

( * ) Notice: Subject to any disclaimer, the term of this patent is extended or adjusted under 35 U.S.C. 154(b) by 441 days.

(21) Appl. No.: 12/166,446

(22) Filed: Jul. 2, 2008

(65) Prior Publication Data

US 2009/0018793 A1      Jan. 15, 2009

Related U.S. Application Data

(60) Provisional application No. 60/959,195, filed on Jul. 12, 2007.

(51) Int. Cl.
*G06F 19/00* (2006.01)
*G01R 31/28* (2006.01)

(52) U.S. Cl. .................................. 702/123; 714/724
(58) Field of Classification Search .............. 702/119, 702/123; 324/763, 765; 714/25, 741, 724
See application file for complete search history.

(56) References Cited

U.S. PATENT DOCUMENTS

| | | | |
|---|---|---|---|
| 2002/0049941 A1* | 4/2002 | Lunde et al. | 714/724 |
| 2003/0196139 A1* | 10/2003 | Evans | 714/25 |
| 2006/0267577 A1* | 11/2006 | Erez et al. | 324/158.1 |

\* cited by examiner

*Primary Examiner* — Bryan Bui
(74) *Attorney, Agent, or Firm* — Mirna Abyad; Wade J. Brady, III; Frederick J. Telecky, Jr.

(57) ABSTRACT

A system and method for reducing device test time are disclosed herein. A method for reducing device test time includes applying a linear program solver to select a first set of tests for testing a device from a second set of tests for testing the device. The first set of tests is selected to reduce the time required to test the device while allowing no more than a predetermined number of devices tested to pass the first set of tests and fail the second set of tests.

20 Claims, 2 Drawing Sheets

|  | TEST 1 | TEST 2 | TEST 3 | TEST 4 | TEST 5 |
|---|---|---|---|---|---|
| COST | 1s | 2s | 3s | 4s | 5s |
| DEVICE 1 | 1 | 0 | 0 | 1 | 0 |
| DEVICE 2 | 0 | 1 | 0 | 1 | 0 |
| DEVICE 3 | 0 | 0 | 0 | 0 | 1 |
| DEVICE 4 | 0 | 0 | 0 | 1 | 1 |

METHOD AND SYSTEM FOR REDUCING DEVICE TEST TIME

CROSS-REFERENCE TO RELATED APPLICATIONS

The present application claims priority to U.S. provisional patent application Ser. No. 60/959,195, filed Jul. 12, 2007, and entitled "Linear Programming Optimization Methodology Applied to Probe Test Cost Reduction and Capacity Improvement" hereby incorporated herein by reference.

BACKGROUND

Manufacturers of integrated circuits ("ICs") produce circuits in batches on a semiconductor substrate known as a wafer. Each individual circuit or device contained on a wafer is referred to as a "die." A single wafer can contain a large number of individual die.

Generally, die are tested before being extracted from the wafer. Die are tested to isolate defects that could adversely affect the circuit's functionality and to ensure that the device performs adequately over a specified range of temperatures and/or voltages. Electrical testing of the die is sometimes performed by bringing a set of contacts or probes into electrical contact with the die being tested (i.e., the circuit under test). Some probes introduce electrical stimulus signals into the circuit under test. Additional probes detect electrical signals produced by the circuit under test in response to the stimulus signals. Die may be tested serially, or a number of die may be tested simultaneously.

The time required to test an integrated circuit directly affects the cost of producing the circuit. In some cases, the cost of testing an integrated circuit constitutes a substantial portion of the circuit's overall production cost. Further, the overall capacity of a production facility may be limited by the rate at which devices manufactured at the facility can be tested, requiring purchase of additional testers to alleviate the bottleneck. Thus, it is desirable to reduce the time required to test an integrated circuit.

SUMMARY

Accordingly, various techniques for reducing the time required to test an integrated circuit are herein disclosed. In accordance with at least some embodiments, a method includes applying a linear program solver to select a first set of tests for testing a device from a second set of tests for testing the device. The first set of tests is selected to reduce the time required to test the device while allowing no more than a predetermined number of devices tested to pass the first set of tests and fail the second set of tests.

In other embodiments, a system includes a test time minimizer that selects a first set of tests for testing a device from a second set of tests for testing the device. The first set of tests is selected to reduce the time required to test the device while allowing no more than a predetermined number of devices tested to pass the first set of tests and fail the second set of tests. The test time minimizer includes a linear program solver that selects the tests of the first set.

In yet other embodiments, a test system includes means for reducing device test time by selecting a first set of tests for testing a device from a second set of tests for testing the device while allowing no more than a predetermined number of devices tested to pass the first set of tests and fail the second set of tests.

BRIEF DESCRIPTION OF THE DRAWINGS

For a detailed description of exemplary embodiments of the invention, reference will now be made to the accompanying drawings in which.

NOTATION AND NOMENCLATURE

Figures 1, 2:
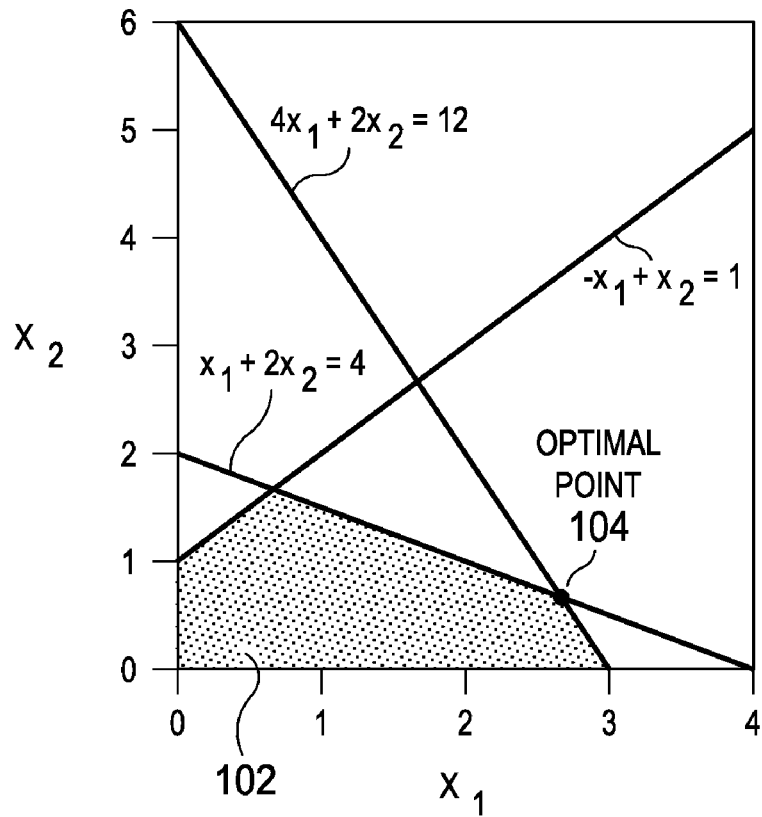
FIG. 1 shows an graphical example of a simple linear program solution.
FIG. 2 shows a table including test execution times and device test failures for optimizing device test time in accordance with various embodiments.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . . " Also, the term "couple" or "couples" is intended to mean either an indirect or direct electrical connection. Thus, if a first device couples to a second device, that connection may be through a direct electrical connection, or through an indirect electrical connection via other devices and connections. The term "system" refers to a collection of two or more hardware and/or software components, and may be used to refer to an electronic device or devices, or a sub-system thereof. Further, the term "software" includes any executable code capable of running on a processor, regardless of the media used to store the software. Thus, code stored in non-volatile memory, and sometimes referred to as "embedded firmware," is included within the definition of software.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment. While embodiments of the present disclosure are described primarily in the context of die level integrated circuit testing, those skilled in the art will recognize that embodiments are applicable to minimizing the time required to test a wide variety of devices. The present disclosure encompasses all such embodiments.

As explained above reducing the time required to test a device, for example an integrated circuit, is one way to reduce the cost of testing the device and thus to reduce the cost of producing the device. Some embodiments of a method for reducing device test time, refrain from further testing a device after a failure is detected. Such embodiments reduce test time when devices are tested serially, but may not reduce test time when multiple devices are tested simultaneously. Some embodiments remove from the suite of tests applied to a device, tests that detect few or no device failures. Often, there are redundancies in a device test suite, wherein a defective device is detected by more than one test of suite. Thus, redundant tests may be removed from the test suite without affecting the detection of defective devices. Further, some embodiments allow a percentage of devices tested to pass the test suite even though the parts are defective. That is, a defective parts budget is established for the device. Embodiments of the present disclosure identify a subset of a device test suite that reduces (e.g., minimizes) the time required to test a device while maintaining a defective parts budget established for the device. More specifically, embodiments of the present disclosure apply linear programming to select the tests that minimize test time while constrained by the defective parts budget.

Linear programming, also known as linear optimization, is a mathematical technique for finding an optimum solution to a linear function, known as an objective function, subject to a set of linear constraints. The number of variables and inequalities considered in a linear programming problem is dependent on the complexity of the problem, and can be quite large. A variety of methods for solving linear programming problems are well known, including simplex algorithms and interior point methods. Tools for solving linear programming problems are widely available, for example, SAS/OR® Software running on any of a variety of known computing platforms.

One simple example of a linear programming problem involves maximizing the objective function $$x_1+x_2$$

subject to the constraints $$x_1 \geq 0,$$

$$x_2 \geq 0,$$

$$x_1+2x_2 \leq 4,$$

$$4x_1+2x_2 \leq 12, \text{ and}$$

$$-x_1+x_2 \leq 1.$$

This example includes 2 variables and 5 constraints. Because only 2 variables are included, the problem can be solved, as shown in FIG. 1, by graphing the constraints in a plane and finding a point within the polygon 102 formed by the constraints that maximizes the objective function. Here, the optimum solution is found at point 104. In general, the objective function takes its optimum value (i.e., maximum or minimum value) at one of the vertices of the polytope formed by the constraints. Most linear programming problems include many more variables and/or constraints than the example presented, and thus are not so easily solved.

Embodiments of the present disclosure apply linear programming techniques to minimize the time required to test a device, and thus to reduce the production cost of the device. Device test time is reduced by selecting an optimal set of tests from a set of all available tests, where the optimal set of test is constrained by a defective parts budget. FIG. 2 shows a set of exemplary parameters for use in selecting optimal tests in accordance with embodiments of the present disclosure. FIG. 2 includes data for M tests, across N defective devices, where here M=5 and N=4.

FIG. 2 shows five tests, Test1-Test5, from which an optimal set of tests will be selected. In practice, the number of tests will generally be greater than the number illustrated in FIG. 2. For example, an exhaustive test suite may include hundreds of tests. Embodiments of the present disclosure are not limited to any particular number of tests. The table row "Cost," of FIG. 2, shows the execution time for each test. Thus, Test 1 executes in 1 second, Test 2 executes in 2 seconds, etc. A "1" in a column corresponding to a Device indicates the Device failed the corresponding Test, and a "0" indicates that the Device passed the corresponding Test. Thus, Device 1 failed Test 1 and Test 4, and passed Tests 2, 3, and 5. Each Device failing at least one Test is included in the table of FIG. 2.

Given the test results and test execution times shown in FIG. 2, and the goal of minimizing device test time, the objective function to be minimized is $$\text{TestTime}=X_{T1}+2X_{T2}+3X_{T3}+4X_{T4}+5X_{T5} \qquad (1)$$

where each test variable $X_{Tn}$ takes a value of either '1' or '0' depending on whether the test is included in the optimized test suite and Cost 204 (i.e., the execution time of the particular test) is included as a coefficient of each test variable. More generally, equation (1) can be written as $$\text{TestTime} = \sum_{m=1}^{M} c_m x_m, \qquad (2)$$

where M is the total number of tests (i.e., the number of tests in the exhaustive set of tests), $c_m$ is the execution time for test $T_m$, and $x_m$ takes values of '0' or '1' depending on whether the test is included in the optimized test suite.

As explained above, embodiments of the present disclosure constrain optimal test selection based on a desired defective part budget. If, for example, the defective part budget is zero, meaning that every device found to be defective using the exhaustive test suite (i.e. Test 1-Test 5) should also be found defective by the optimized test suite, the constraint equations applicable to the selection are:

$$X_{T1}+X_{T4} \geq 1 \qquad (3)$$

$$X_{T2}+X_{T4} \geq 1, \qquad (4)$$

$$X_{T6} \geq 1, \text{ and} \qquad (5)$$

$$X_{T4}+X_{T6} \geq 1 \qquad (6)$$

The test results of FIG. 1 expressed in matrix form $$R = \begin{bmatrix} 1 & 0 & 0 & 1 & 0 \\ 0 & 1 & 0 & 1 & 0 \\ 0 & 0 & 0 & 0 & 1 \\ 0 & 0 & 0 & 1 & 1 \end{bmatrix}, \qquad (7)$$

yield a more general form of the constraint inequalities above:

$$\sum_{m=1}^{M} R_{nm} x_m \geq 1. \qquad (8)$$

The above constraints (inequalities (3)-(6)) require that the optimized test suite include at least one test failed by each of Device 1-Device 5. When the above objective function and constraints are provided to a linear program solver, for example SAS/OR®, and a minimization is performed, Test 1, Test 2, and Test 5 will be selected for the optimized test suite. Thus, a device tester embodiment will expend 15 seconds to simultaneously test the four devices of FIG. 1 if executing the entire suite of available tests, as will a device tester that discontinues testing of a device after encountering a failure. An embodiment applying only Test 4 and Test 5 selected on an intuitive basis because they catch the most defects will expend 9 seconds testing the four devices. A device tester embodiment in accordance with the present disclosure will expend only 8 seconds to simultaneously test the four devices of FIG. 1 if executing the optimized test suite.

Referring again to the parameters of FIG. 1, if a defective parts budget greater than zero is specified, then a set of tests can be selected for the optimized test suite that does not detect all the defective parts identified by the exhaustive test suite. In this case, the defective parts may be detected at a later stage of testing, for example, after the integrated circuit die are packaged. To optimize the test suite when including a non-zero defective parts budget, additional variables $Y_1, Y_2, Y_3$, and $Y_4$ are introduced. The constraints defined by inequalities (3)-(6) are modified as $$X_{T1} + X_{T4} \geq Y_1 \tag{9}$$

$$X_{T2} + X_{T4} \geq Y_2, \tag{10}$$

$$X_{T6} \geq Y_3, \text{ and} \tag{11}$$

$$X_{T4} + X_{T6} \geq Y_4, \tag{12}$$

and an additional constraint $$Y_1 + Y_2 + Y_3 + Y_4 = 4 - \alpha \tag{13}$$

is introduced. Where $Y_n$ may take a value of either '0' or '1,' $\alpha$ denotes the number of defective devices the optimized test suite is allowed to miss, and data from 4 defective devices is being processed. More generally, the above constraints may be expressed as:

$$\sum_{m=1}^{M} R_{nm} x_m \geq Y_n, \tag{14}$$

for each device, and $$\sum_n Y_n \geq (N - \alpha). \tag{15}$$

Embodiments of the present disclosure provide constraints (9)-(13) and objective function (1) to a linear program solver. The linear program solver selects a set of tests that minimizes device test time while allowing no more than the number of defective devices specified by the defective parts budget to go undetected.

Figure 3:
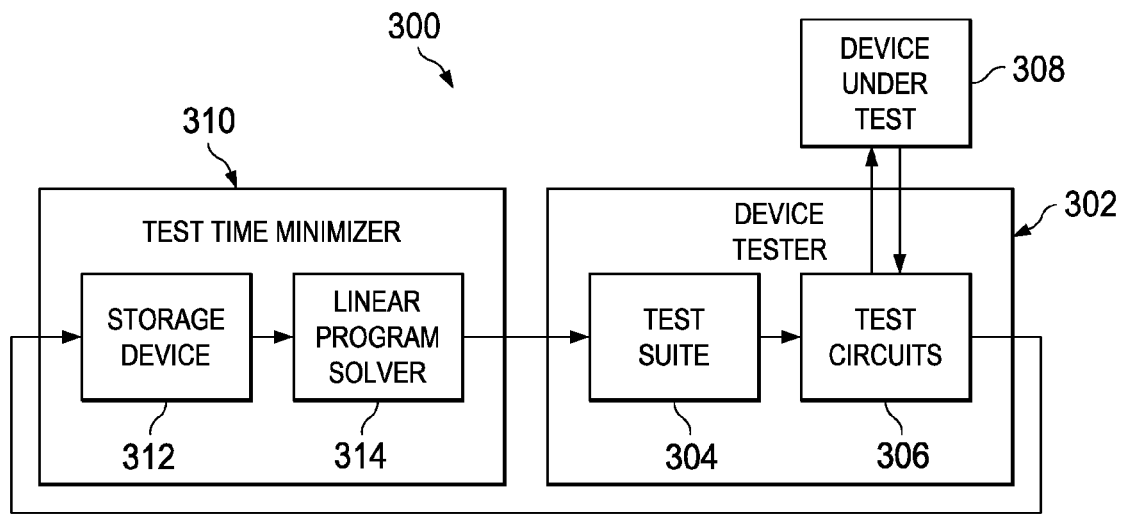
FIG. 3 shows an illustrative system for reducing device test time in accordance with various embodiments.

FIG. 3 shows an illustrative test system 300 that minimizes device test time in accordance with various embodiments. The test system 300 includes device tester 302 and test time minimizer 310. The device tester 302 applies a suite of tests 304 to a device under test ("DUT") 308 through a set of test circuits 306. The test circuits 308 provide stimuli and measure the responses of the DUT 308 to the supplied stimuli. Initially, the test suite 304 applied to the DUT includes all the tests available for testing the DUT 308 (i.e., the exhaustive test suite). The device tester 302 applies each test of the exhaustive test suite to each DUT 308 tested, and the result (pass/fail) of each test is recorded to use in producing an optimized test suite that reduces the time required to test a device. Each test is applied to each DUT 308 even if the DUT 308 fails a test in order to identify redundancies among the tests.

The execution time of each test of the test suite 304 is determined by any known means, including, for example, having the device tester 302 measure the execution time of each test as the test is performed, or by computing the execution time based on known test time parameters. The execution time of each test of the test suite 304 is recorded to use in producing an optimized test suite that reduces the time required to test a device. The device tester 302 may be, for example, any of a variety of multiprobe testers for testing integrated circuit die. Such testers are well known to those skilled in the art.

The test results produced by applying the exhaustive test suite to a quantity of devices tested by the device tester 302, and the execution time of each test of the test suite 304 are provided to the test time minimizer 310 and stored in storage device 312. Embodiments of the test time minimizer 310 may be implemented as a computer, for example, a personal computer or server computer, etc, and associated software that selects tests from the exhaustive test suite to create the optimized test suite. Such a computer will generally include a processor, such as a microprocessor, storage devices, such as random access memory ("RAM"), read only memory ("ROM"), and/or disk drives coupled to the processor by one or more buses, and various input/output devices, such as video displays, keyboards, network adapters, etc. The test time minimizer 310, may be implemented as part of the device tester 302 in some embodiments, and separate from the device tester 302 in other embodiments.

The test time minimizer 310 includes a linear program solver 314 that selects an optimized set of tests from the exhaustive test suite in accordance with methods explained herein. The linear program solver is generally a software program, for example SAS/OR® software. Embodiments of the test time minimizer 310 are not limited to any particular linear program solver 314. Parameters that the linear program solver 314 reads from the storage device 312 to create the optimized test suite include the test execution times and test results discussed above, and a defective part budget. These parameters form the linear objective function and linear constraints explained above. The number of parameters (i.e., the test and device test results of failed devices) will generally be relatively large, for example, hundreds of tests and thousands of device failures. As explained above, the linear program solver 314 uses these parameters to compute a test set that tests a device in the minimum time interval while maintaining the specified defective part budget.

The tests selections identifying tests included in the optimized test suite are provided to the device tester 302 to serve as test suite 304 and applied to the DUT 308 to reduce the required device test time and consequently to reduce device test expense.

Figure 4:
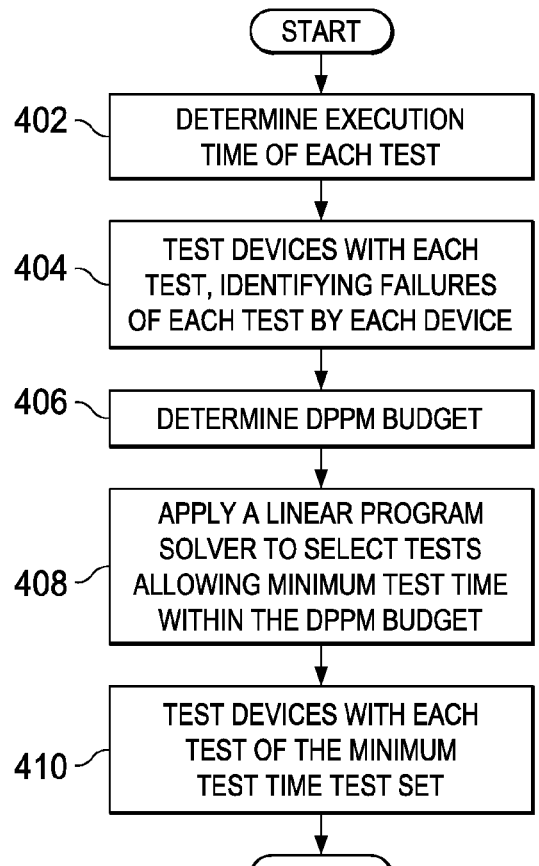
FIG. 4 shows an illustrative flow diagram for a method for reducing device test time in accordance with various embodiments.

FIG. 4 shows an illustrative flow diagram for a method for reducing device test time in accordance with various embodiments. Though depicted sequentially as a matter of convenience, at least some of the actions shown can be performed in a different order and/or performed in parallel. In block 402, the execution time of each test in the exhaustive test suite is determined. Any empirical or analytical method for determining execution time may be used (e.g., the test time may be measured during application by the device tester 302 or computed separately based on known test cycle times). The exhaustive test suite 304 is applied, by the device tester 302, to test a number of devices 308 in block 404. The exhaustive test suite can contain all the tests available to test a device, or a sub-set of all available tests. Each test of the test suite 304 is run on each device 308 irrespective of whether the device 308 failed a previously run test. The result of each test (i.e., pass/fail) run on each device 308 is recorded for use in producing an optimized test suite.

In block 406, a defective part budget is determined. The defective part budget determines the number of defective devices that the optimized test suite is allowed to pass that the exhaustive test suite would have found to be defective. The defective part budget may sometimes be referred to as a "DPPM," or defective parts per million, budget when the number of devices found to be defective is relative to one million devices tested. The determination of a defective parts budget may be determined, for example, by balancing the cost of not detecting a defective device with the cost of the test time required to detect the defective device. The defective parts budget may be determined by, for example, a computer executing a program that evaluates the economic factors and test data relevant to a higher or lower defective parts budget, or by a individual based on economic and test data and/or experience.

In block 408, the execution time of each test, the results of each test applied to each device 308 failing a test, and the defective parts budget are provided to a test time minimizer 310 that includes a linear program solver 314. The test time minimizer 310 uses the linear program solver 314 to select the tests from the exhaustive test suite that minimize device test time subject to the defective parts budget. The test selections are provided to a device tester 302 to form an optimized version of test suite 304, and subsequently applied to test a quantity of devices 308. In some embodiments, the test time minimizer 310 may supply a list of tests to be removed from the exhaustive test suite to form the optimized test suite.

In block 410, the device tester 302 applies the optimized test suite 304 to test devices 308. Each test in the optimized test suite 304 is applied to each device 308 tested, and the results (pass/fail) of each test applied to each device are recorded. By applying the optimized test suite 304, the test time per device 308 is reduced, resulting in reduced device 308 production cost. Moreover, because the test capacity of a device tester 302 increases in direct relation to the test time reduction, fewer device testers 302 may be required to test a number of devices 308, resulting in a further reduction in test expense.

The above discussion is meant to be illustrative of the principles and various embodiments of the present invention. Numerous variations and modifications will become apparent to those skilled in the art once the above disclosure is fully appreciated. For example, while embodiments of the present disclosure have been explained in reference to integrated circuit die testing; those skilled in the art will understand that embodiments are applicable to testing a wide variety of devices. It is intended that the following claims be interpreted to embrace all such variations and modifications.

What is claimed is:

1. A method of a processor, comprising:
applying a linear program solver to select, via the processor, a first set of tests for testing a device from a second set of tests for testing the device, the first set of tests is selected to reduce the time required to test the device while allowing no more than a predetermined number of devices tested to pass the first set of tests and fail the second set of tests.

2. The method of claim 1, further comprising testing a plurality of devices using the second set of tests, wherein each test of the second set is applied to each device.

3. The method of claim 2, further comprising determining an execution time of each test of the second set of tests.

4. The method of claim 1, further comprising determining a number of device failures allowed to go undetected by the first set of tests that are detected by the second set of tests.

5. The method of claim 1, further comprising providing to the linear program solver an objective function to be minimized, the variables of the objective function representing the tests of the second set of tests, and a coefficient of each variable comprising an execution time of a test.

6. The method of claim 1, further comprising providing to the linear program solver a constraint to the solution of the objective function, the constraint comprising a number of defective devices that pass the first set of tests and fail the second the set of tests.

7. The method of claim 1, further comprising providing to the linear program solver the results of each test of the second set of tests for each device failing a test of the second set of tests.

8. The method of claim 1, further comprising executing each test of the first set of tests on a device.

9. A system, comprising:
a test time minimizer that selects a first set of tests for testing a device from a second set of tests for testing the device, the first set of tests is selected to reduce the time required to test the device while allowing no more than a predetermined number of devices tested to pass the first set of tests and fail the second set of tests;
wherein the test time minimizer comprises a linear program solver that selects the tests of the first set.

10. The system of claim 9, further comprising a device tester that tests the device by executing one of the first set of tests and the second set of tests.

11. The system of claim 10, wherein, the device tester executes each test of the second set of tests to test each device of a plurality of devices prior to the selection of the first set of tests.

12. The system of claim 10, wherein the device tester measures an execution of time each test of the second set of tests.

13. The system of claim 9, wherein the test time minimizer provides an execution time of each test of the second set of tests to the linear program solver as a coefficient of an objective function to be solved by the linear program solver in selecting the first set of tests.

14. The system of claim 9, wherein the test time minimizer provides information indicating whether a device failed each test of the second set of tests to the linear program solver as a constraint of the objective function to be solved by the linear program solver in selecting the first set of tests.

15. The system of claim 9, wherein the test time minimizer provides information indicating a percentage of devices tested that can pass the first set of tests and fail the second set of tests to the linear program solver as a constraint of the objective function to be solved by the linear program solver in selecting the first set of tests.

16. The system of claim 9, wherein the system is an integrated circuit test system.

17. An integrated circuit test apparatus, comprising:
means for reducing device test time by selecting a first set of tests for testing a device from a second set of tests for testing the device while allowing no more than a predetermined number of devices tested to pass the first set of tests and fail the second set of tests.

18. The integrated circuit test apparatus of claim 17, wherein an execution time of each test of the second set of tests is provided to the means for reducing, the execution time of each test serving as a coefficient of a variable representing a test in a linear function to be optimized to select the first set of tests.

19. The integrated circuit test apparatus of claim 17, wherein the results of each test of the second set of tests for each device failing a test of the second set of tests are provided to the means for reducing, the test results are elements of constraints to reducing the test time.

20. The integrated circuit test apparatus of claim 17, wherein a number of devices permitted to fail the first set of tests and pass the second set of tests are provided to the means for reducing, the number of devices permitted to fail is a constraint to reducing the test time.

* * * * *